United States Patent
Rubo et al.

(10) Patent No.: US 10,334,998 B2
(45) Date of Patent: Jul. 2, 2019

(54) FLEXIBLE CONTAINER AND REUSABLE CLOSURE ELEMENT

(71) Applicant: The Procter & Gamble Company, Cincinnati, OH (US)

(72) Inventors: Brigitte Rubo, Linden (DE); Heiner Wilhelm Maria Bouten, Zuelpich (DE); Oliver Heilmann, Bad Soden (DE)

(73) Assignee: The Procter & Gamble Company, Cincinnati, OH (US)

( * ) Notice: Subject to any disclaimer, the term of this patent is extended or adjusted under 35 U.S.C. 154(b) by 112 days.

(21) Appl. No.: 15/089,634

(22) Filed: Apr. 4, 2016

(65) Prior Publication Data

US 2016/0213206 A1     Jul. 28, 2016

Related U.S. Application Data (63) Continuation of application No. 12/969,989, filed on Dec. 18, 2010, now Pat. No. 9,327,892.

(30) Foreign Application Priority Data

Dec. 18, 2009 (EP) .................................... 09179906

(51) Int. Cl.
| | | |
|---|---|---|
| A47K 10/42 | (2006.01) | |
| B65D 83/08 | (2006.01) | |
| B65D 75/58 | (2006.01) | |
| A47K 10/32 | (2006.01) | |

(52) U.S. Cl.
CPC ........ A47K 10/421 (2013.01); B65D 75/5838 (2013.01); B65D 75/5877 (2013.01); B65D 83/0805 (2013.01); *A47K 2010/3266* (2013.01); *B65D 2575/586* (2013.01); *Y02W 30/807* (2015.05)

(58) Field of Classification Search
USPC ....... 221/33, 34, 61–64, 154, 199, 302, 303, 221/306
See application file for complete search history.

(56) References Cited

U.S. PATENT DOCUMENTS

| 4,131,195 A * | 12/1978 | Worrell, Sr. ....... B65D 83/0805 206/205 |
|---|---|---|
| 4,185,754 A * | 1/1980 | Julius ................... A47K 10/421 206/210 |

(Continued)

FOREIGN PATENT DOCUMENTS

| GB | 2 238 769 | 12/1991 | |
|---|---|---|---|
| JP | WO 2009057766 A1 * | 5/2009 | ......... B65D 75/5838 |

OTHER PUBLICATIONS

All Office Actions, U.S. Appl. No. 12/969,989 (now U.S. Pat. No. 9,327,892).

(Continued)

*Primary Examiner* — Gene O Crawford
*Assistant Examiner* — Kelvin L Randall, Jr.
(74) *Attorney, Agent, or Firm* — Sarah M. DeCristofaro; William E. Gallagher; Christian M. Best (57) ABSTRACT

An assembly offering to consumers a choice between two types of closure systems for a wipes flexible container is provided. The assembly comprises at least one flexible container and a reusable closure element.

8 Claims, 3 Drawing Sheets

(56) References Cited

U.S. PATENT DOCUMENTS

| | | | | | |
|---|---|---|---|---|---|
| 4,681,240 | A | * | 7/1987 | Wyant | B65D 83/0805 221/302 |
| 5,725,311 | A | * | 3/1998 | Ponsi | B65D 75/5838 206/494 |
| 5,791,465 | A | * | 8/1998 | Niki | B65D 75/5894 206/210 |
| 6,702,109 | B1 | * | 3/2004 | Tabuchi | B65D 75/5838 206/233 |
| 7,007,801 | B2 | * | 3/2006 | Mangold | A47K 10/421 206/494 |
| 7,051,877 | B2 | * | 5/2006 | Lin | B65D 75/5838 206/233 |
| 7,350,688 | B2 | * | 4/2008 | Sierra-Gomez | B65D 75/5838 206/459.1 |
| 7,416,083 | B2 | * | 8/2008 | Bando | A47K 10/421 206/210 |
| 7,600,641 | B2 | * | 10/2009 | Burgess | B65D 75/5838 206/233 |
| 7,665,629 | B2 | * | 2/2010 | Julius | A47K 10/421 221/302 |
| 7,842,365 | B2 | * | 11/2010 | Riggs | G09F 3/0292 220/359.1 |
| 8,181,783 | B2 | * | 5/2012 | Kakura | B65D 75/5838 206/494 |
| 2002/0166284 | A1 | * | 11/2002 | Weder | A47G 7/085 47/72 |
| 2003/0192903 | A1 | * | 10/2003 | Sauer | A47K 10/42 221/48 |
| 2004/0093773 | A1 | * | 5/2004 | Clark | B42D 15/045 40/124.06 |
| 2005/0011906 | A1 | * | 1/2005 | Buck | B65D 75/5833 221/64 |
| 2005/0150785 | A1 | * | 7/2005 | Julius | A47K 10/421 206/233 |
| 2006/0071014 | A1 | * | 4/2006 | Xiong | B65D 75/366 221/282 |
| 2007/0295744 | A1 | * | 12/2007 | Sarbo | A47K 10/421 221/63 |
| 2008/0128451 | A1 | * | 6/2008 | Krauth | B65D 43/169 221/63 |
| 2008/0179326 | A1 | * | 7/2008 | Krauth | B65D 75/5838 220/260 |
| 2009/0057306 | A1 | * | 3/2009 | Johnson | B65D 81/3294 220/4.33 |
| 2009/0249558 | A1 | * | 10/2009 | Fileccia | C11D 11/0017 8/137 |

OTHER PUBLICATIONS

PCT International Search Report and Written Opinion, dated Feb. 18, 2011 (8 pages).

* cited by examiner

FLEXIBLE CONTAINER AND REUSABLE CLOSURE ELEMENT

CROSS REFERENCES TO RELATED APPLICATIONS

The present application is a continuation of U.S. application Ser. No. 12/969,989, filed on Dec. 16, 2010, which claims the benefit of European Patent Application No. 09179906, filed on Dec. 18, 2009, the substance of which is incorporated herein by reference.

BACKGROUND

An assembly offering the choice to consumers between two types of closure system for a wipes flexible container is disclosed.

Many types of household and personal care articles, such as dust cloths, wipes, wet wipes, facial cloths are commonly packaged inside flexible containers. In a typical flexible container for packaging such goods, a flexible pouch is formed of a flexible sheet material. Access into the interior of the pouch is typically provided by way of a dispensing opening in the sheet material.

The dispensing opening is typically closed by a flexible sealing member to prevent contamination and/or drying of the container content inside the pouch prior to use. The flexible sealing member is typically adhered to the pouch by means of an adhesive.

Some containers are outfitted with relatively rigid closure elements. A typical relatively rigid closure element includes two elements that interlock, such as a base that is adhered to the pouch and a lid, such as a hinged lid.

Consumers may prefer containers outfitted with a relatively rigid closure element. Indeed, such closure element may allow the user to easily close the container without the need to insert his/her fingers through the dispensing opening to push back in the container the uppermost wipe of the stack that may extend through and above the dispensing opening after the withdrawal of a former wipe, such as in a pop-up dispensing format. This easy closure may be appreciated in circumstances of use such as when a user whose one hand is occupied in a task, such as holding a baby during a diaper change, must use his or her free hand to close the container. The easy closure may also protect the wipes from external contaminations, e.g. soils, dirt and germs that may be present on the user's hands, by limiting the physical contact with the user's hands. In addition, reliability in the closure performance may also be appreciated. Indeed, the lid may be repeatedly opened and closed without any loss of performance. Such a loss of performance may occur with flexible sealing members: their adhesive surface performances may deteriorate by accumulation of dust and dirt. Notwithstanding all the above advantages, wipes flexible containers outfitted with a relatively rigid closure element are not yet a commodity. This may result, in part, of the negative impact they have on manufacturing costs. Indeed, the manufacturing costs of wipes containers are significantly increased by the provision of such closure system. Furthermore, they add complexity to the manufacturing process.

Some other consumers may still prefer wipes containers having a flexible sealing member. Indeed, some of them may choose to place the flexible container in a rigid box and so the presence of a relatively rigid closure element becomes irrelevant for them and may even prevent them from doing so. Some other consumers may simply prefer and choose to use the flexible container as it is.

Thus, consumers' preferences in terms of closure systems for wipes containers are different. So far, industrial did not find a way to satisfy each type of consumers without increasing significantly the manufacturing costs.

Thus, it is challenging to satisfy every consumer, e.g. consumers preferring containers with relatively rigid closure elements and consumers preferring containers with flexible sealing members and, not add substantial costs and complexity to the manufacturing of wipes containers.

SUMMARY

The present application relates to an assembly providing the choice of closing systems for flexible containers.

The assembly may comprise at least one flexible container and a closure element. The flexible container may comprise a pouch made of a flexible sheet material, said pouch having walls defining and enclosing an interior space, a dispensing opening in at least one of the walls of said pouch, through which the interior space is accessible, said dispensing opening being delimited by a border, a sealing area surrounding said dispensing opening, a releasable flexible sealing member for sealing said dispensing opening and separable sheets present in said interior space. The closure element has a base having a top surface and a bottom surface, an outer rim and an inner rim, a dispensing aperture defined by the inner rim of the base, a lid for sealing the dispensing aperture. The sealing area of the assembly may comprise a non-permanent adhesive material for repeatedly adhering the flexible sealing member and releasably attaching the closure element.

The present application further relates to a process for preparing an assembly providing the choice of closing systems for flexible containers. The process may comprise providing one or more pouch made of a flexible sheet material and may comprise a pre-cut opening in said flexible sheet material, permanently adhering an adhesive-comprising sheet material with a second opening, substantially congruent with the pre-cut opening, over the pre-cut dispensing opening, providing a closure element and packing the one or more pouch with the closure element. The adhesive-comprising sheet material applied on a the pre-cut opening has a top surface and a bottom surface wherein the top surface comprises a non-permanent adhesive material covered by a flexible sealing member and the bottom surface comprises a permanent adhesive material to permanently adhere the adhesive-comprising sheet material to the pouch.

DETAILED DESCRIPTION

While the following describes one or more embodiments of an assembly in relation to wipes, it is to be understood that the assembly is not limited to such materials. The one or more embodiment of the assembly shown and described herein may be useful for any material that may be dispensed in individual sheets, such as individual sheets dispensed from a roll of perforated sheets or from a stack of interfolded or non-interfolded sheets. Individual sheets dispensed from a roll of perforated sheets or from a stack of interfolded or non-interfolded sheets are referred herein as "separable sheets." Examples of separable sheets include, but are not limited to, dry wipes, facial tissues and bath tissues. In particular, an assembly comprising a flexible container can be useful for containing and dispensing pre-moistened wipes, referred to as wet wipes. Examples of use of wet wipes include, but are not limited to, baby wipes, feminine hygiene wipes, polishing wipes, floor cleaning wipes, dish cleaning wipes.

One or more embodiments herein provide an assembly offering the choice to consumers between the two types of closure system e.g., consumers preferring containers with relatively rigid closure elements and consumers preferring containers with flexible sealing members, and not adding substantial extra-costs and complexity to the manufacturing of wipes containers. Furthermore, it has been discovered that consumers being more and more concerned about environmental issues, the one or more embodiments of the present assembly may contribute to the combined efforts of industrials and consumers to limit their environmental footprint on earth by advantageously considering the use of a reusable closure element.

The term "disposed" refers to an element being positioned in a particular place.

The term "attach" refers to elements being connected or united by adhering, bonding by any method suitable for the elements being attached together and their constituent materials. Elements may be attached "permanently," i.e., attached in such a way that one or both elements must be damaged in order to separate them. Alternatively, elements may be attached "releasably" or "non-permanently," i.e., attached in such a way that neither of the elements needs to be damaged in order to separate them.

The term "resealable" refers to an element than once unsealed can be resealed.

One or more embodiments herein relate to an assembly comprising at least one flexible container containing separable sheets, e.g. wet wipes and a closure element. The flexible container and the closure element are configured to cooperate such that the flexible container may be outfitted with the closure element very easily and conveniently. Each feature of the present assembly will be described in details herein below.

One embodiment of the assembly comprises at least one flexible container. The flexible container comprises a pouch which is made of a flexible sheet material, e.g., a flexible polymeric sheet material. The pouch has walls defining and enclosing an interior space. Separable sheets are present in the interior space.

The pouch may be formed partially or wholly of a polymeric material, as is typical in the art. Suitable polymeric materials may include polyethylene, polypropylene, polyethylene terephtalate, polyamide, polyester, polyvinylchloride and combinations thereof. The polymeric material(s) utilized in the pouch may have the form of a film and may include only a single layer or multiple layers in a laminated structure. Such a laminated structure may include more than one film and/or may include a layer or layers in other forms, such as a fibrous sheet, an aluminum foil or an adhesive layer. The film or laminate may contain fillers such as silica, alumina and/or calcium carbonate. The film or laminate may have a thickness comprised between 12 and 100 microns.

The flexible sheet material forming the pouch may be gas impervious or liquid impervious depending on the individual sheets dispensed. For instance, if the need to contain moisture or the need to exclude moisture exists, such as when wet wipes are stored in the flexible container, then a flexible sheet material which is impervious to liquid may be used to form the pouch as described above. In another instance, a flexible sheet material which is impervious to gas and liquid may be used to form the pouch when perfumes are contained in the lotion impregnating the wipes. If neither of these needs exits, the flexible sheet material may be water-permeable and gas-permeable.

The flexible container may have any shape suitable for enclosing its contents. The flexible container may be, for example, cylindrical, polygonal or parallelepipedal in shape.

Figure 1:
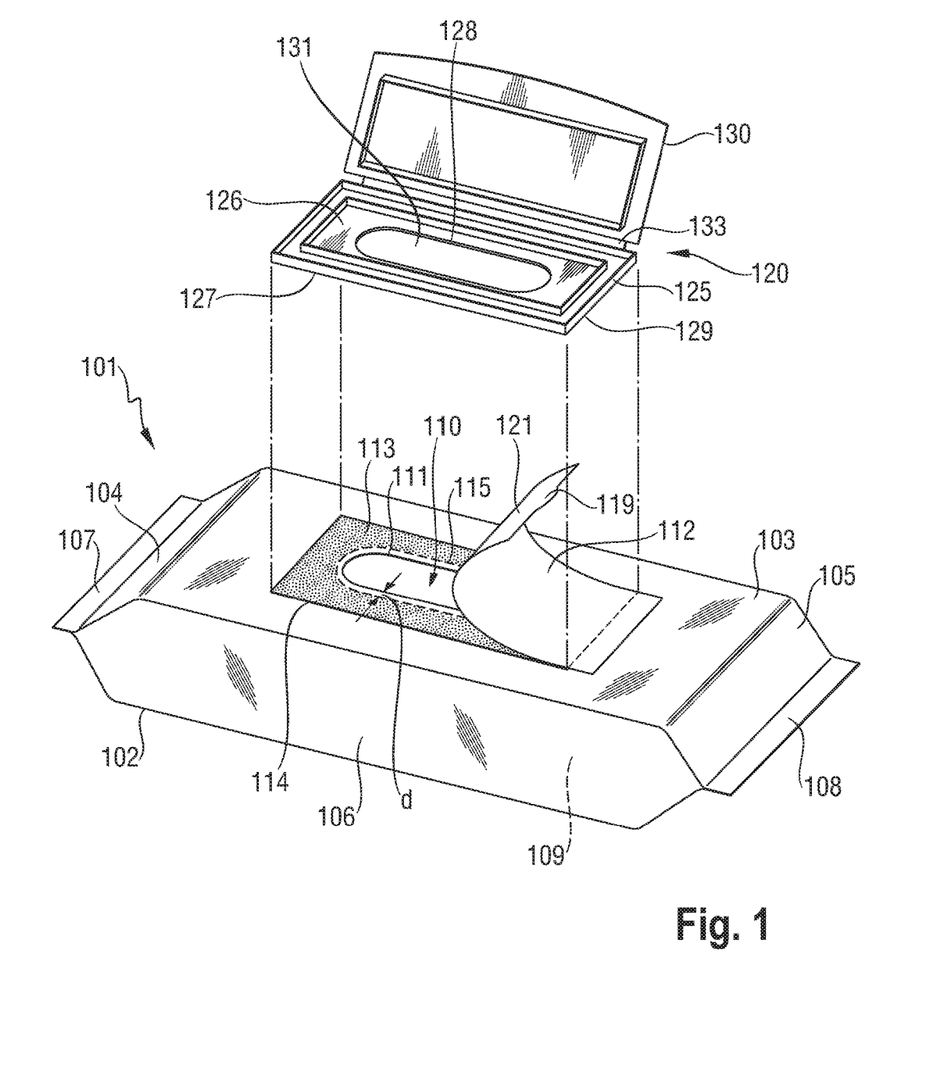
FIG. 1 is a perspective view of an assembly comprising a flexible container and a closure element.
Figure 2A:
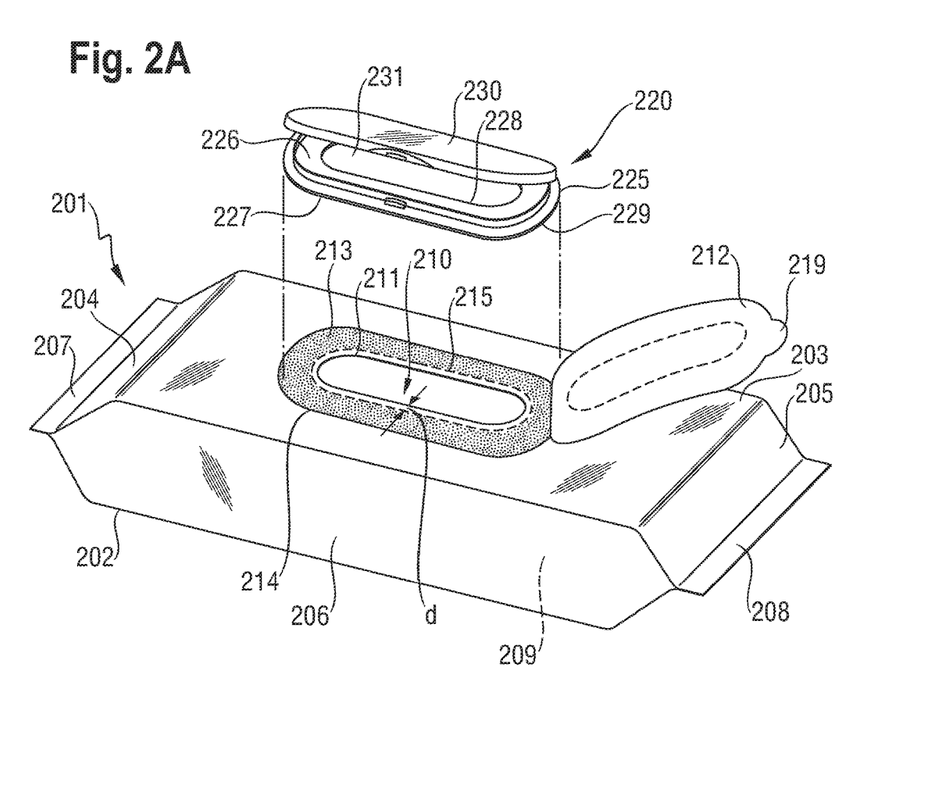
FIG. 2A is a perspective view of an assembly comprising a flexible container and a closure element.
Figure 3A:
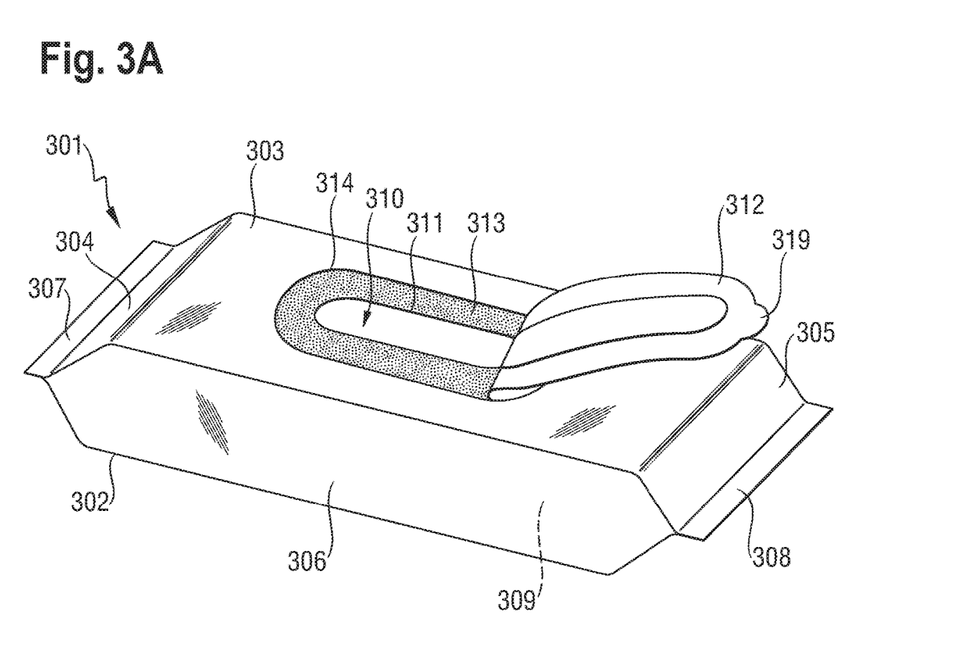
FIG. 3A is a perspective view of a flexible container.

Each of FIGS. 1, 2A and 3A illustrates an exemplary embodiment of a flexible container 101, 201, 301 comprising a pouch 102, 202, 302 formed of a flexible polymeric sheet material. The pouch has a top wall 103, 203, 303, an opposing bottom wall (not shown in the figures for clarity), opposing end walls 104, 204, 304 and 105, 205, 305, a front side wall 106, 206, 306 and an opposing rear side wall (not shown in the figures for clarity), arranged in a generally parallelepipedal configuration. The opposing end walls are closed by end seals 107, 207, 307 and 108, 208, 308. The walls define and enclose the interior space 109, 209, 309 of the pouch which contains separable sheets (not shown in the figures).

The flexible container has a dispensing opening delimited by a border in at least one of the walls through which the interior space is accessible from outside the pouch. Generally, the flexible container has a dispensing opening in the top wall of the pouch. However, such a dispensing opening may be made in another of the walls, instead of, or in addition to the top wall. The dispensing opening may be fully formed during the manufacturing process or its border may be defined, but not cut out, by perforation or laser scoring of the sheet material forming the pouch.

The dispensing opening may have any shape suitable for access into the interior space of the flexible container. The exemplary dispensing openings 110, 210, 310, shown in FIGS. 1, 2A and 3A, have a relatively simple oval shape delimited by a border 111, 211, 311. However, the dispensing opening may have a different relatively simple shape, such as a polygonal shape or rectangular shape or a circular shape, or may have a relatively complex shape, such as a generally rectangular shape with rounded corners, or a shape with multiple protrusions, e.g., shape of clover leaf or peanut.

The flexible container comprises a releasable flexible sealing member for sealing the dispensing opening. By "releasable" as used herein, it is meant that the flexible sealing member can be separated intentionally from the flexible container by the user without being damaged or without damaging the flexible container.

At first opening, the flexible sealing member is pulled away from the surface of the flexible container to expose the dispensing opening of the flexible container and provide access to the separable sheets enclosed in the flexible container. The flexible sealing member can then be re-adhered to the flexible container to reseal the dispensing opening. The flexible sealing member is thus resealable, i.e., the dispensing opening can then be repeatedly sealed and unsealed. Conveniently, a portion of the flexible sealing member remains attached or adhered to the flexible container when that one is pulled away from the surface of the flexible container. This enables the user to easily open and close the flexible container when using it as it is, i.e., not outfitted with a closure element. Examples of flexible sealing member 112, 212, 312 are shown in FIGS. 1, 2A and 3A.

The flexible sealing member is formed of a flexible material, which may be identical to the flexible sheet material of which the pouch is formed or may be different. Suitable materials may include, but are not limited to, polyethylene, polypropylene, polyethylene terephtalate, polyamide, polyester, polyvinylchloride and combinations thereof. Where the wipes are pre-moistened wipes, the material comprises a liquid impervious material.

The dispensing opening of the flexible container is surrounded by an area, referred herein as the sealing area, which comprises a non-permanent adhesive material continuously or discontinuously applied in said area.

Exemplary sealing areas 113, 213, 313 are illustrated in FIGS. 1, 2A, 2B, 3A and 3B.

As shown in FIGS. 1, 2A, 2B, 3A and 3B, in embodiments wherein the non-permanent adhesive material is applied continuously in the sealing area, said sealing area 113, 213, 313 is the area where there is the non-permanent adhesive material present. It is the area comprised between an outer perimeter line 114, 214, 314 surrounding the dispensing opening 110, 210, 310, i.e., the perimeter line the farthest from the border 111, 211, 311 of the dispensing opening 110, 210, 310, and an inner perimeter line 115, 215, 315 surrounding the dispensing opening, i.e., the perimeter line the closest from the border 111, 211, 311 of the dispensing opening 110, 210, 310.

In embodiments wherein the adhesive material is applied discontinuously in the sealing area, said sealing area is defined by the area comprised between an inner perimeter and an outer perimeter line. The inner perimeter line corresponds to the imaginary line drawn around the dispensing opening at an equidistance from its border and which passes through the point comprising the adhesive material the closest from the border of the dispensing opening; the outer perimeter line corresponds to the imaginary line drawn around the dispensing opening at an equidistance from its border and which passes through the point comprising the adhesive material the farthest from the border of the dispensing opening.

Figure 2B:
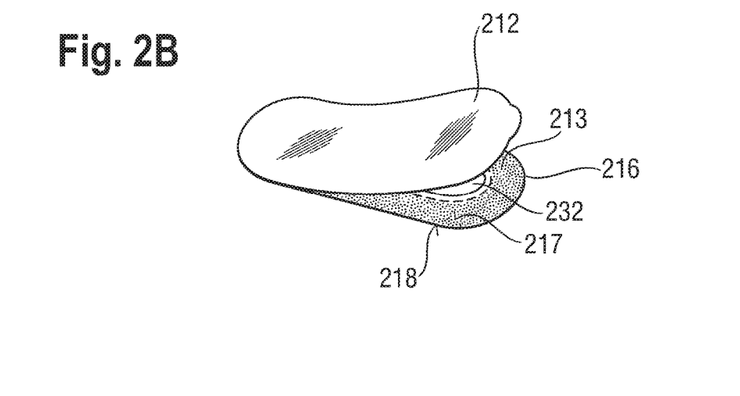
FIG. 2B is a perspective view of an adhesive-comprising sheet material covered by a flexible sealing member.
Figure 3B:
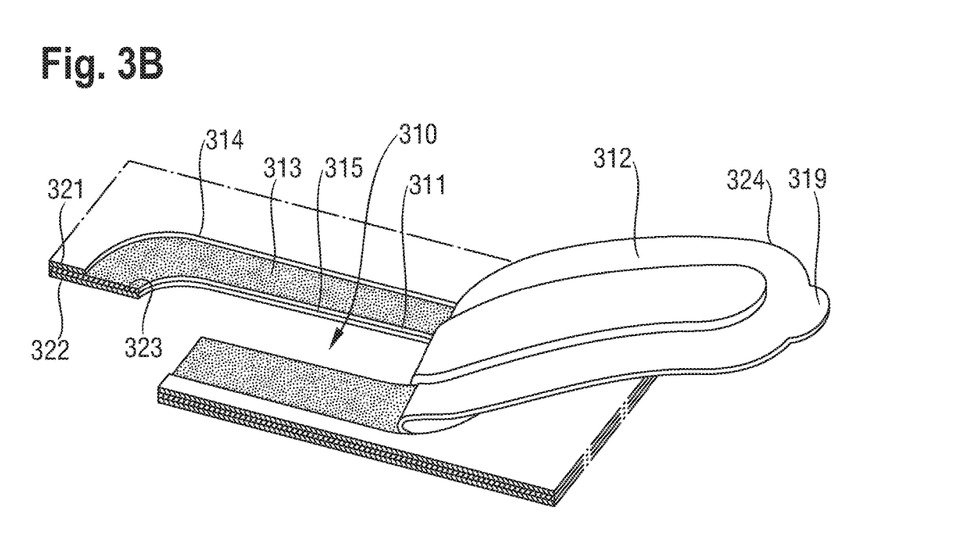
FIG. 3B is a partial view of a flexible container showing the structure of the flexible sheet material forming the flexible container.

In some embodiments, the inner perimeter line 315 delimiting the sealing area 313 may coincide with the border 311 of the dispensing opening. An illustrative embodiment is shown in FIG. 3. In other embodiments, the inner perimeter line 115, 215 may be spaced from the border 111, 211 of the dispensing opening by a distance d comprised between 0.1 and 20 mm, or between 0.2 and 15 mm or between 0.4 and 4 mm, as shown in FIGS. 1 and 2. The distance d is measured as the shortest distance between a random point taken on the border of the dispensing opening and the inner perimeter line of the sealing area. This distance d may be in all points equal or may vary between 0.1 and 20 mm, or between 0.2 and 15 mm or between 0.4 and 4 mm depending on the points selected on the border of the dispensing opening.

In one or more embodiments, the inner perimeter line may not coincide with the border of the dispensing opening in order to limit contacts between the non-permanent adhesive material comprised in the sealing area and the wipes upon their withdrawal from the flexible container. Such contacts may deteriorate the adhesive performances of the non-permanent adhesive material comprised in the sealing area.

As mentioned above, the sealing area comprises a non-permanent adhesive material. The non-permanent adhesive material may be applied continuously in the sealing area or may be applied discontinuously, i.e., intermittently, in the sealing area. Where applied continuously in the sealing area, the non-permanent adhesive material surrounds completely the dispensing opening, whereas where applied discontinuously, the non-permanent adhesive material may not necessarily surround completely the dispensing opening, i.e., not forming a closed enclosure. Any patterns, such as droplets, discrete figures, alternating stripes may be used to apply the non-permanent adhesive material discontinuously in the sealing area. By alternating stripes, it is meant that regions in which the non-permanent adhesive material is applied as stripes are separated by regions having no adhesive material applied. In one embodiment, the alternating stripes may extend in straight lines from the dispensing opening, such as rays spreading from the dispensing opening. Typically, when applied discontinuously, the non-permanent adhesive material covers at least 40%, or at least 60%, or at least 80% of the total area of the sealing area. It may be preferred to have the non-permanent adhesive material applied continuously in the sealing area to ensure a more secure attachment of the closure element to the flexible pouch and to provide an efficient air-tight seal.

Independently of being applied continuously or discontinuously, the non-permanent adhesive material may be applied uniformly, i.e., homogeneously (same quantity per surface area) in the sealing area or may be applied non-uniformly, i.e., non-homogeneously (different quantity per surface area) in the sealing area.

The sealing area may be provided by directly applying a non-permanent adhesive material on the flexible sheet material forming the pouch in the appropriate area surrounding the dispensing opening. Alternatively, the sealing area may be provided by adhering an adhesive-comprising sheet material around the dispensing opening of the flexible container. Such an adhesive-comprising sheet material comprises a hole which may be of the size of the dispensing opening of the flexible container, or may be larger or smaller, provided the user can still access the wipes stored in the flexible container. An illustrative adhesive-comprising sheet material 216 is exemplified in FIG. 2B. The adhesive-comprising sheet material 216 has a top surface 217 and a bottom surface 218 and a hole 232. The top surface 217 comprises a non-permanent adhesive material. The non-permanent adhesive material may be continuously or discontinuously applied on part of, or on the whole surface of the top surface of the adhesive-comprising sheet material, as described herein above. It may be applied uniformly or non-uniformly. The top surface, or part of, comprising the non-permanent adhesive material plays the role of sealing area 213. The bottom surface 218 comprises a permanent adhesive material to permanently adhere the adhesive-comprising sheet material around the dispensing opening of the flexible container. In other executions, the sealing area 313 may be formed by a part of the flexible sheet material forming the pouch which is exposed when the flexible sealing member 312 is lifted away from the surface of the flexible container as shown in FIGS. 3A and 3B.

The sealing area of the flexible container may comprise a dual functionality:
 (1) it enables the repeated adhesion of the flexible sealing member to the flexible container to seal the dispensing opening,
 (2) it enables the releasable attachment of the closure element to the flexible container.
This dual-functionality is made possible by the presence of the non-permanent adhesive material.

Repeated Adhesion of the Flexible Sealing Member

As mentioned above, the dispensing opening of the flexible container may be repeatedly sealed and unsealed by a flexible sealing member.

When the dispensing opening is sealed, the flexible sealing member adheres to the sealing area, or to a part thereof, in a way that the dispensing opening and the sealing area, or a part thereof, are covered by the flexible sealing member. In one embodiment, the flexible sealing member adheres and covers the entirety of the sealing area. Generally, the flexible sealing member may have any shape suitable for covering the dispensing opening and the sealing area. It may have a relatively simple shape or a relatively complex shape. Examples of simple shape include oval, circular or rectangular shape. Examples of relatively complex shape include rectangular shape with rounded corners, or a shape with multiple protrusions.

The flexible sealing member may have at least one lifting tab 119, 219, 319 located along the periphery of the flexible sealing member 112, 212, 312 as shown in FIGS. 1, 2 and 3. This lifting tab is adapted to be grasped by a user and used to lift the flexible sealing member away from the surface of the flexible container to thereby expose the dispensing opening and provide access to the individual sheets enclosed inside the interior space of the pouch. The lifting tab may have a relatively simple shape, such as a rounded shape or a rectangular shape, or may have a relatively complex shape, such as a shape with multiple protrusions.

When the dispensing opening is unsealed by lifting the flexible sealing member away from the surface of the flexible container, the sealing area may be partially exposed or totally exposed. Indeed, in some embodiments, lifting up the flexible sealing member may expose only a part of the sealing area, a part thereof remaining covered by the flexible sealing member (FIGS. 2A and 3A). In these embodiments, the sealing area becomes totally exposed only upon separation of the flexible sealing member from the flexible container, such as when the user wants to outfit the flexible container with the closure element of the present assembly. In some embodiments, lifting up the flexible sealing member to gain access to the dispensing opening may expose totally the sealing area (FIG. 1).

As shown in FIG. 1, the flexible sealing member 112 may be a separate element releasably attached to the flexible container 101 by means known to the person skilled in the art. Suitable methods include, but are not limited to, adhesive attachment, cohesive attachment, heat sealing. Such flexible sealing members are well known in the art. The releasable attachment of the flexible sealing member 112 to the flexible container 101 is strong enough to prevent a complete separation of the flexible sealing member 112 from the flexible container when the user lifts up the flexible sealing member to gain access to the dispensing opening, i.e., a non-intentional separation, but the attachment does not prevent intentional complete separation. The complete separation of the flexible sealing member 112, such that when the user wants to dispose a closure element 120 onto the flexible container 101, does not damage the flexible sealing member 112 nor the flexible container 101. In the embodiment shown, the surface 121 of the flexible sealing member 112 contacting the flexible container is free of adhesive material: the bonding of the flexible sealing member 112 to the flexible container 101 is achieved by the non-permanent adhesive material present in the sealing area 113. In a manufacturing process, the dispensing opening 110 may be cut out and covered by the flexible sealing member 112, or its border 111 may be only defined by perforation or laser scoring such as to be completed by the user when lifting up the flexible sealing member 112. In an embodiment in which the dispensing opening is only defined, e.g., pre-cut, the flexible sealing member 112 is placed on the top surface of the pouch to cover the pre-cut dispensing opening 110 and the sealing area 113. An adhesive material, which may be identical to the non-permanent adhesive material comprised in the sealing area 113 or different, is provided in the area defining the dispensing opening. When the flexible sealing member 112 is pulled up upon unsealing, the pre-cut portion is pulled up together with the flexible sealing member 112 to open the dispensing opening 110 and the sealing area 113, or part thereof, is exposed to the surface.

FIG. 2A illustrates an embodiment wherein the flexible sealing member 212 is a separate element releasably attached to the adhesive-comprising sheet material 216 forming the sealing area 213. In such an embodiment, the flexible sealing member 212 is congruent with the adhesive-comprising sheet material 216. The flexible sealing member 212 is attached to the adhesive-comprising sheet material 216 such that its separation from the adhesive-comprising sheet material is prevented when the user lifts up the flexible sealing member to gain access to the dispensing opening of the flexible container, i.e., a non-intentional separation. Nevertheless, the flexible sealing member's complete separation remains possible upon intention. For instance, smaller adhesive forces may be provided in the area wherein the flexible sealing member 212 needs to be peeled off to expose the dispensing opening 210 and higher adhesive force may be provided in the area that remains in contact with the adhesive-comprising sheet material to prevent a complete separation. Nevertheless, in certain embodiments, the adhesive forces should not be too high such as to prevent the intentional complete separation when the user wants to dispose the closure element on the flexible container. In the manufacturing process, the hole of the adhesive-comprising sheet may be already cut-out or may be pre-cut such than when the flexible sealing member is pulled up upon unsealing, the dispensing opening of the flexible container and the hole of the adhesive-comprising sheet material are created at the same time.

As shown in FIG. 3A, the flexible sealing member 312 may be part of the flexible sheet material forming the pouch, i.e., the flexible sealing member 312 is unitary with the pouch. In such embodiments, the flexible sheet material forming the pouch may be a laminated sheet material comprising at least three layers. With reference to FIG. 3B, the laminated sheet material comprises two layers of a polymeric material 321, 322 sandwiching an adhesive layer 323. In the manufacturing process, the laminated sheet material is pre-cut to define the border 324 of the flexible sealing member 312 and the border 311 of the dispensing opening 310. The pre-cutting is operated in a way that, when the pre-cut part of the pouch defining the flexible sealing member 312 is pulled up upon unsealing, it creates an opening, i.e., the dispensing opening 310, and exposes a part of the adhesive layer 323 of the laminated sheet material that corresponds to the sealing area 313, or to a part thereof. The pre-cutting is also operated in a way that the flexible sealing member 312 does not separate from the flexible container when the user lifts up the flexible sealing member to gain access to the content of the flexible container. Nevertheless, its separation remains possible intentionally.

Releasable Attachment of the Closure Element

Advantageously, the sealing area, on top of enabling the repeated adhesion of the flexible sealing member, enables the releasable attachment of the closure element comprised in the present assembly.

The closure element may be made of rigid material. "Rigid" means the material is relatively inflexible (i.e., not extendable or collapsible). However, more or less flexible parts may be provided on the closure element for ease of removal of the closure element from the flexible container. In alternative embodiments, the closure element may be made of a relatively flexible material. In one embodiment, the rigid closure element is relatively rigid compared to the flexible sheet material forming the pouch and/or to the flexible sealing member. Suitable closure element may be formed partially or wholly of a thermoplastic material, such as polypropylene, polyethylene, polystyrene, acrylonitryl butadiene styrene (ABS), polyester, polyvinyl chloride, polycarbonate or elastomer, or a blend of these materials. The closure element may also, or alternatively, be formed partially or wholly of other materials, such as cardboard, corrugated paper, wood, cardstock, paper, ceramic, and combinations thereof. They can be suitably made by injection moulding, blow moulding or thermoforming.

Typically, the closure element 120, 220 comprises a base 125, 225 and a lid 130, 230. As illustrated in FIGS. 1 and 2A, the base 125, 225 has a top surface 126, 226 and a bottom surface 127, 227, an inner rim 128, 228 and an outer rim 129, 229. The inner rim of the base 128, 228 defines a dispensing aperture 131, 231. Said dispensing aperture 131, 231 is sealed by a lid 130, 230 which forms a contact with the base 125, 225. In some embodiments, the base and/or lid of the closure element may have a thickness comprised between 0.4 and 1.5 millimeters.

As known in the art, the base and the lid may be connected by a relatively flexible flap 133 forming a hinge as shown in the FIG. 1, or may be connected by a multi-piece hinge mechanism. In the figures, the lid 130, 230 is shown in an "open" condition in which the dispensing aperture 131, 231 is accessible. The base and the lid may engage in any suitable manner such that the lid will remain in a "closed" configuration once engaged with the base. In order to subsequently gain access to the dispensing aperture, the base and the lid must be disengaged such that the lid can be swung on the hinge to the "open" condition shown in the figures.

In some embodiments, the dispensing aperture defined by the inner rim of the base may be coextensive with the dispensing opening of the flexible container when the closure element is disposed appropriately on the flexible container, i.e., disposed around the dispensing opening in order to cover as much as possible the sealing area, or it may be larger or smaller than the dispensing opening of the flexible container. The dispensing aperture may have a simple shape, such as a polygonal shape, oval, rectangular shape or a circular shape, or may have a relatively complex shape, such as a generally rectangular shape with rounded corners, or a shape with multiple protrusions, e.g., shape of clover leaf or peanut.

In some embodiments, the dispensing aperture may be a constricting aperture designed to constrict the wipes as they are pulled through the dispensing aperture by the user, e.g., a dispensing aperture including a baffle or comprising protuberances that may be shaped and sized according to the desired application.

The closure element may be desirably attached to the flexible container by contacting and pressing the bottom surface of the closure element's base onto the sealing area of the flexible container once the flexible sealing member has been separated from the flexible container. The attachment of the closure element is releasable. Indeed, the user may detach the closure element from a flexible container and dispose it on another flexible container.

The bottom surface of the base is designed to be substantially congruent with the sealing area so as to form a seal with the sealing area when the closure element is appropriately superimposed to the sealing area. This includes embodiments whereby the sealing area is completely congruent with the bottom surface of the base (i.e., coincide exactly with the bottom surface of the closure element's base, having thus the same shape and same size) and embodiments whereby the bottom surface of the base and the sealing area may have a shape and size not completely identical, but nevertheless substantially complementary such as to provide a secure attachment, (e.g., the contact area between the sealing area and the bottom surface of the base needs to be sufficient to ensure a secure attachment). In some embodiments, the contact area between the sealing area and the bottom surface of the base may be comprised between 20% and 100% of the total area of the bottom surface of the base. In other embodiments, it may be comprised between 30% and 100%, or between 50% and 100% of the total area of the bottom surface of the base. A contact area of 100% may be preferred to ensure a secure attachment of the closure element and an efficient air-tight seal.

By "appropriately superimposed," it is meant that the closure element is placed around the dispensing opening such as to cover the sealing area as much as possible.

In some embodiments, the sealing area may have the shape of the bottom surface of the base but be of a larger size. For instance, the outer perimeter line delimiting the sealing area may be at a maximal distance of 10 mm, or of 6 mm or, of 4 mm from the outer rim of the base when the closure element is appropriately superimposed to the sealing area and/or the inner perimeter line delimiting the sealing area may be at a maximal distance of 10 mm or, of 6 mm or, of 4 mm from the inner rim of the base when the closure element is appropriately superimposed to the sealing area. The distances x and y are measured respectively as the shortest distance possible between a random point taken on the outer/inner perimeter line delimiting the sealing area and the outer/inner rim of the closure element. These distances may be in all points equal or may slightly vary. To allow the user to easily position and secure the closure element onto the flexible container, the sealing area may be larger but of the shape of the bottom surface of the closure element.

In other embodiments, the sealing area may have the shape of the bottom surface of the base but be of a smaller size.

In other embodiments, the sealing area and the bottom surface of the base may have different sizes and different shapes, provided that a minimal contact area between the two is ensured to result in a secure attachment. In some embodiments, the contact area between the sealing area and the bottom surface of the base may be comprised between 20% and 100% of the total area of the bottom surface of the base. In other embodiments, it may be comprised between 30% and 100%, or between 50% and 100% of the total area of the bottom surface of the base.

The closure element may have a simple shape, such as a rectangular, polygonal, round or oval shape, or it may have a more complex shape such as a generally rectangular shape with rounded corners, or a shape with multiple protrusions provided it suitably covers the dispensing opening and the sealing area of the flexible container.

As mentioned above, the closure element may be desirably attached to the flexible container by simply contacting and pressing the bottom surface of the closure element's base onto the sealing area of the flexible container. The sealing area may comprise visuals guiding the consumer in the right positioning of the closure element. For instance, the visuals may be provided by the non-permanent adhesive material comprised in the sealing area, i.e., the non-permanent adhesive material may be a colored adhesive material enabling to visually distinguish the sealing area from the rest of the flexible container, i.e., the color of the adhesive material is different from the color of the flexible sheet material forming the pouch. In some embodiments, the visuals may be provided by a different layout in the sealing area, the non-permanent adhesive material being in these executions transparent or translucent, e.g., the material in the sealing area may be of a color different from the rest of the flexible container or may comprise artworks, graphics, cues, figures helping the user to easily visualize the sealing area and thus to appropriately position the closure element.

It is to be understood that, in certain embodiments herein, the closure element of the assembly may not comprise an attachment mechanism or attachment means dedicated to the attachment of the closure element to the flexible container, e.g., a layer of adhesive material coated on the bottom surface of the base or any kind of attachment means that would require the insertion of the closure element or, of a part of it, in the flexible container via the dispensing opening. The bottom surface of the base of the present closure element is plane. The absence of the attachment mechanism or attachment means offers several advantages. Typically, the present closure element has a longer life time. Indeed, the present closure element may be repeatedly attached, detached and reattached. When the closure element comprises an adhesive coating, the number of attachment/ detachment may be limited because of the deterioration of the adhesive performance of the coating with time and uses. Advantageously, in the present assembly, each flexible container is provided with the non-permanent adhesive material necessary to the attachment of the closure element. Thus, each time the user wants to outfit a flexible container with the closure element, the user benefits from the unaltered adhesive properties of the sealing area. The closure element of the present assembly is also less prone to breakages compared to closure elements having protruding elements that enable the attachment of the closure element to the flexible container. The attachment mechanism or attachment means in the form of protruding elements may be easily inadvertently broken making the closure element of no use. Additionally, the closure element of the present assembly can be disposed on the flexible container very easily and conveniently: a mere superimposition to the sealing area. The need to insert the fingers in the flexible container to attach the closure element is avoided, thus limiting the risk to contaminate the wipes or to tear the flexible container when placing the closure element.

The dual-functionality of the sealing area, i.e., repeated adhesion of the flexible sealing member and releasable attachment of the closure element, is made possible by the presence of the non-permanent adhesive material. As readily apparent for a person skilled in the art, the non-permanent adhesive material needs to be compatible with the materials constituting the flexible container, the flexible sealing member and the closure element.

In certain embodiments, the non-permanent adhesive material is such that it enables repeated adhesion of the flexible sealing member and ensures a releasable but still secure attachment of the closure element to the flexible container. By "secure," it is meant that unintended separation of the closure element from the flexible container is prevented. For instance, in a situation where a user lifts up the wipes flexible container from a surface by grasping the closure element, this latest should remain attached and secured to the flexible container. Thus, the non-permanent adhesive material shall provide an adhesive force between the material of the sealing area and the closure element which is at least higher than the downward force caused by the weight of a flexible container filled with wipes but lower than the force needed to detach the closure element from the flexible container upon intention. As it is known for a person skilled in the art, the suitable adhesive force will depend on the materials constituting the flexible container, the closure element, the flexible sealing member and on the weight of flexible container containing wipes, e.g., dry wipes or wet wipes.

Suitable non-permanent adhesive materials include, but are not limited to, polyester, acrylic, emulsion adhesive, solvent type adhesive, hot-melt adhesive or pressure sensitive adhesive, acrylicester adhesive, polyvinyl acetate resin adhesive, polyurethane resin adhesive, silicone adhesive, epoxy polyester resin adhesive, polyamide adhesive, acrylate adhesive or rubber based adhesive. The non-permanent adhesive material may be water-resistant if the need exits, such as when the flexible container contains wet wipes.

The dual-functionality of the sealing area also present advantages from a manufacturing point of view. It does not add extra-steps to the manufacturing process. Suitably, a method for preparing the present assembly may comprise the steps of providing a flexible sheet material, pre-cutting a dispensing opening in the flexible sheet material and forming at least one pouch, permanently adhering an adhesive-comprising sheet material as shown in FIG. 2B over the pre-cut dispensing opening, said adhesive-comprising sheet material comprising a cut-out hole or a pre-cut hole substantially congruent with the pre-cut dispensing opening of the pouch and having a top surface and a bottom surface wherein said top surface comprises a non-permanent adhesive material covered by a flexible sealing member and said bottom surface comprises a permanent adhesive material to permanently adhere said adhesive-comprising sheet material to the pouch, providing a closure element and packing the at least one pouch with said closure element.

The disclosed assembly may comprise at least one flexible container and a closure element. In other embodiments, the assembly may comprise more than one flexible container, e.g., two, three, four, five, six or more flexible containers and a closure element. The assembly is intended to be used and/or sold in combination. In one embodiment, the at least one flexible container may be packaged in a first package and the closure element in a second package. The first and second packages may be packaged together or they may be held in assembly by any means. In another embodiment, the closure element may be packaged with one or more flexible container as one individual package.

The assembly may also comprise a set of instructions for communicating to a consumer the relationship between the flexible container and the closure element, how to dispose the closure element on the flexible container. The set of instructions may be in any forms. Typically, the set of instruction may be in the form of texts, graphics, charts, visuals cues, other indicia or combination thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. An assembly for providing a choice of closing systems, said assembly comprising:
   (a) at least one flexible container which comprises:
      (i) a pouch formed from a flexible sheet material, said pouch having one or more walls that define and enclose an interior space;
      (ii) a dispensing opening in at least one of the walls of said pouch, through which the interior space is accessible, said dispensing opening being delimited by a border;
      (iii) a sealing area substantially surrounding said dispensing opening, the sealing area including a non-permanent adhesive material;
      (iv) a releasable flexible sealing member for sealing said dispensing opening, the releasable flexible sealing member covering the dispensing opening and being releasably attached to the sealing area by the non-permanent adhesive material;
      (v) a plurality of separable sheets present in said interior space;
   (b) a rigid closure element comprising:
      (i) a base having a top surface and a bottom surface, an outer rim and an inner rim;
      (ii) a dispensing aperture defined by the inner rim of the base; and
      (iii) a lid for sealing the dispensing aperture;
   wherein the sealing area, the releasable flexible sealing member and the base of the closure element are configured such that the releasable flexible sealing member covers the sealing area prior to removal of the releasable flexible sealing member from the container; removal of the releasable flexible sealing member from the container exposes the sealing area and the non-permanent adhesive material thereof, and the base of the closure element may be adhered to the container via the non-permanent adhesive, to substantially cover the sealing area upon appropriate superimposition thereover, following removal of the releasable flexible sealing member from the container;
   wherein the sealing area is delimited by an outer perimeter line and an inner perimeter line, wherein the outer perimeter line is spaced from the outer rim of the base by a distance of between 0 and 10 mm when the closure element is superimposed on the sealing area;
   wherein the closure element comprises an outer perimeter line;
   wherein the outer perimeter line of the sealing area forms generally the same shape as the outer perimeter line of the closure element;
   wherein the inner perimeter line of the sealing area is spaced from the inner rim of the base by a distance of between 0 and 10 mm when the closure element is superimposed on the sealing area;
   wherein the non-permanent adhesive material is uniformly applied in the sealing area;
   wherein the inner perimeter line of the sealing area is spaced from the border of the dispensing opening by a distance of between 0.4 mm and 4 mm;
   wherein the releasable flexible sealing member is part of the flexible sheet material forming said pouch; and
   wherein the non-permanent adhesive material is a colored adhesive material.

2. The assembly according to claim 1 wherein said sealing area is substantially congruent with the bottom surface of the base.

3. The assembly according to claim 1 wherein said sealing area is formed by an adhesive-comprising sheet material disposed around said dispensing opening, said adhesive-comprising sheet material having a top surface and a bottom surface wherein said top surface comprises the non-permanent adhesive material and wherein said bottom surface comprises a permanent adhesive material to permanently adhere said adhesive-comprising sheet material to the pouch.

4. The assembly according to claim 1 wherein at least one of the dispensing opening of the flexible container and the dispensing aperture of said closure element has a shape selected from the group consisting of rectangular, oval, circular, rectangular with rounded corners.

5. The assembly according to claim 1 wherein the non-permanent adhesive material is selected from the group consisting of polyester, acrylic, emulsion adhesive, solvent type adhesive, hot-melt adhesive or pressure sensitive adhesive, acrylicester adhesive, polyvinyl acetate resin adhesive, polyurethane resin adhesive, silicone adhesive, epoxy polyester resin adhesive, polyamide adhesive, acrylate adhesive, rubber based adhesive or any mixture thereof.

6. The assembly according to claim 1 wherein the sheets are selected from the group consisting of dry wipes, wet wipes, facial tissues, bath tissues.

7. The assembly according to claim 1 wherein the sealing area includes indicia selected from the group consisting of graphics, visual cues, figures, texts and combination thereof.

8. A package comprising:
   a. a plurality of flexible containers which comprise:
      (i) a pouch formed from a flexible sheet material, said pouch having one or more walls that define and enclose an interior space;
      (ii) a dispensing opening in at least one of the walls of said pouch, through which the interior space is accessible, said dispensing opening being delimited by a border;
      (iii) a sealing area substantially surrounding said dispensing opening, the sealing area including a non-permanent adhesive material;
      (iv) a releasable flexible sealing member for sealing said dispensing opening, the releasable flexible sealing member covering the dispensing opening and being releasably attached to the sealing area by the non-permanent adhesive material;

(v) a plurality of separable sheets present in said interior space;

(b) a single rigid closure element comprising:

(i) a base having a top surface and a bottom surface, an outer rim and an inner rim;

(ii) a dispensing aperture defined by the inner rim of the base; and (iii) a lid for sealing the dispensing aperture;

wherein the sealing area, the releasable flexible sealing member and the base of the closure element are configured such that the releasable flexible sealing member covers the sealing area prior to removal of the releasable flexible sealing member from the container; removal of the releasable flexible sealing member from the container exposes the sealing area and the non-permanent adhesive material thereof, and the base of the closure element may be adhered to the container via the non-permanent adhesive, to substantially cover the sealing area upon appropriate superimposition thereover, following removal of the releasable flexible sealing member from the container;

wherein the sealing area is delimited by an outer perimeter line and an inner perimeter line, wherein the outer perimeter line is spaced from the outer rim of the base by a distance of between 0 and 10 mm when the closure element is superimposed on the sealing area;

wherein the closure element comprises an outer perimeter line;

wherein the outer perimeter line of the sealing area forms generally the same shape as the outer perimeter line of the closure element;

wherein the inner perimeter line of the sealing area is spaced from the inner rim of the base by a distance of between 0 and 10 mm when the closure element is superimposed on the sealing area;

wherein the non-permanent adhesive material is uniformly applied in the sealing area; and wherein the inner perimeter line of the sealing area is spaced from the border of the dispensing opening by a distance of between 0.4 mm and 4 mm and forms generally the same shape as the outer perimeter line of the closure element; and wherein the releasable flexible sealing member is part of the flexible sheet material forming said pouch.

* * * * *